Sept. 21, 1954 R. L. JAESCHKE 2,689,920
ELECTROMAGNETIC SLIP-COUPLING CONTROL
Filed April 4, 1951 3 Sheets-Sheet 2

Ralph L. Jaeschke,
Inventor.
Koenig and Pope,
Attorneys.

Sept. 21, 1954  R. L. JAESCHKE  2,689,920
ELECTROMAGNETIC SLIP-COUPLING CONTROL
Filed April 4, 1951  3 Sheets-Sheet 3

Ralph L. Jaeschke,
Inventor.
Koenig and Pope,
Attorneys

Patented Sept. 21, 1954

2,689,920

UNITED STATES PATENT OFFICE 2,689,920

ELECTROMAGNETIC SLIP-COUPLING CONTROL

Ralph L. Jaeschke, Kenosha, Wis., assignor, by mesne assignments, to Eaton Manufacturing Company, Cleveland, Ohio, a corporation of Ohio Application April 4, 1951, Serial No. 219,176

8 Claims. (Cl. 310—94)

1

This invention relates to controlled coupling apparatus, and more particularly, to coupling apparatus for internal combustion engines and oil well drilling rigs.

The invention relates to the control of oil well drilling rigs and like apparatus by means of eddy-current slip couplings. The drilling rig includes a known type of multiple-input multiple-output transmission having output shafts driving a known type of draw works, a known type of rotary table which rotates the drill pipe, and a plurality of known types of mud pumps, these elements of the rig being driven by the transmission through associated change-speed units of known type. A plurality of internal combustion engines are coupled in a novel manner to the several input shafts of the transmission through individual eddy-current slip couplings having separately excited field coils. The arrangement is such that any engine may, alone or in combination with other engines, drive any one or all of the various elements on the drilling rig.

Each eddy-current slip coupling is variably excited in a novel manner by means of a control system having a clutch-energizing generator coupled to the driving member of the respective coupling. This control system has a speed-voltage characteristic such that the voltage rises rapidly at a predetermined critical speed, which may be itself varied, the generator being ineffective to excite the coupling at speeds below the critical speed.

Among the several objects of the invention are the provision of controlled coupling apparatus affording increased flexibility of control; the provision of controlled coupling apparatus that automatically drops the load from a prime mover in the event of engine failure; the provision of controlled coupling apparatus that automatically limits the load torque on a prime mover; the provision of coupling apparatus particularly adapted for oil well drilling rigs in that the apparatus is less expensive, more portable and easier to operate than similar coupling apparatus heretofore employed for oil well drilling rigs; and, the provision of coupling apparatus for internal combustion engines and pulsating loads providing longer engine life and permitting the use of smaller transmissions. Other objects will be in part apparent and in part pointed out hereinafter.

The invention accordingly comprises the elements and combinations of elements, features of construction, and arrangements of parts which will be exemplified in the structures hereinafter described, and the scope of the application of

2 which will be indicated in the following claims.

In the accompanying drawings, in which one of various possible embodiments of the invention is illustrated, Fig. 1 is a diagrammatic view of certain components of an oil well drilling rig;

Similar reference characters indicate corresponding parts throughout the several views of the drawings.

Figure 1:
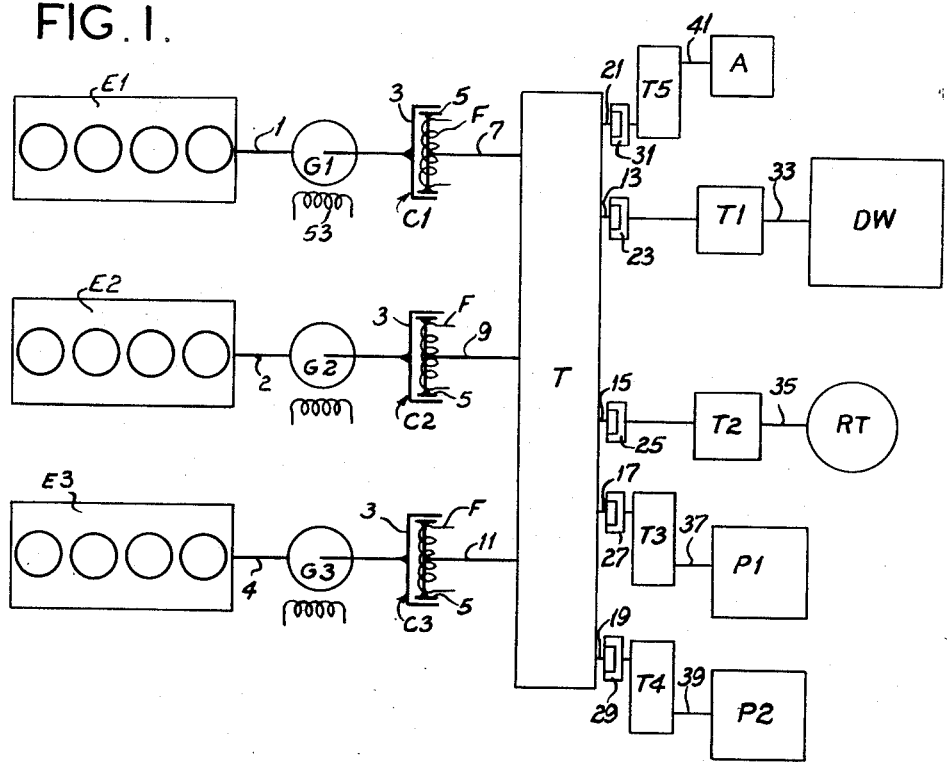

Referring now to Fig. 1 of the drawings, the principal load components of an oil well drilling rig are shown diagrammatically. Briefly, the drilling rig includes a draw works or hoisting mechanism DW for raising the drill pipe; piston-type mud pumps P1 and P2 for circulating the mud (a liquid for clearing the chips from the drill and providing high pressure at the bottom of the hole), several pumps being required in the event that one breaks down; and a rotary table RT which rotates the drill pipe.

Power is supplied to the above load components by a plurality of prime movers E1, E2 and E3, such as stationary internal combustion engines of the diesel type. The engines E1, E2, and E3 are connected through electric slip couplings C1, C2 and C3, respectively, to a multiple-input multiple-output transmission T. The term multiple-input multiple-output transmission is used in the sense that the plural input power paths from the three engines may be combined in the transmission so that the prime movers individually or collectively may supply the mechanical energy for driving any one or all of the various load components of the drilling rig. A multiple engine plant is necessary to insure continuous operation of the rig, particularly the mud pumps.

An output shaft 1 of prime mover E1 is connected to a driving member 3 of the eddy-current slip coupling C1. A driven member 5 of the slip coupling C1 is connected to an input shaft 7 of the multiple-input transmission T. The other two input shafts of the transmission T for engines E2 and E3 are designated 9 and 11, respectively. The engines E2 and E3 have their output shafts 2 and 4, respectively, coupled to couplings C2 and C3, respectively. The three slip couplings C1, C2 and C3 are similar, each comprising an eddy-current inductor member, a field member and a field coil. In the case of each coupling, the driving member 3 is the inductor member and the driven member 5 is the field member, the field member having a field coil F.

Figure 3:
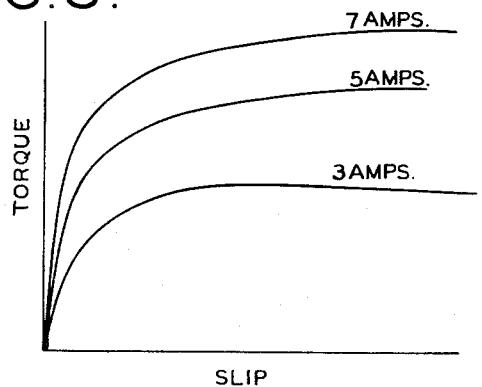
Fig. 3 is a plot illustrating certain characteristics of an eddy-current slip coupling.

These electromagnetic slip couplings are known in the art, being described, for example, in United States Patent 2,465,982, issued March 29, 1949, to M. P. Winther et al. A coupling effect is obtained by causing a polar field member to sweep a relatively continuous inductor member to produce eddy currents therein. These produce a reactive field forming a magnetic slip coupling. The torque transmitted by the coupling depends upon the slip between the field and inductor members and upon the excitation of the field coil. This relationship is shown in Fig. 3, wherein the torque transmitted by the clutch is plotted as a function of the slip speed for different values of field coil excitation. When the coupling is transmitting torque with substantial slip, there is an energy loss in the coupling which appears as heat. For that reason, it may be desirable to water-cool the couplings.

As shown in Fig. 1, the main transmission T has plural output shafts 13, 15, 17, 19 and 21 connected through crown clutches 23, 25, 27, 29, and 31, respectively, to change-speed transmissions T1, T2, T3, T4, and T5, respectively. An output shaft 33 of the change-speed transmission T1 is connected to the hoist DW. The rotary table RT is connected to an output shaft 35 of the change-speed transmission T2; and the pumps P1 and P2 are connected to output shafts 37 and 39 of change-speed transmissions T3 and T4, respectively. Auxiliaries, such as lighting generators and water pumps, may also be driven from the main transmission T, these auxiliaries being represented by the block A connected to the output shaft 41 of change-speed transmission T5.

The transmission arrangement apart from the eddy-current slip couplings does not form a part of this invention. In the past, friction clutches, hydraulic couplings and generator-motor sets have been used in the power transmitting line between the prime movers and the main transmission T. The nature of the typical drilling rig is such that friction clutches, hydraulic couplings and generator-motor sets are not satisfactory from the viewpoint of operation. As will be pointed out, this invention provides improved operational characteristics and is of simple, rugged construction. It should be borne in mind that the drilling rig equipment must possess a considerable degree of portability and simplicity in order to be readily movable and to withstand the hard conditions of use to which it is put.

Each eddy-current slip coupling C1, C2 or C3 has the capacity to transmit approximately 125% of the maximum torque supplied by the respective engine at maximum clutch energization. This causes a very small amount of slip always to be present in the eddy-current couplings when fully excited, the slip being of the order of 1%. The engine pulsations in large power plants are quite severe, consequently the eddy-current coupling will have greater than a 1% instantaneous rate of slip over a fraction of an engine revolution, as during a cylinder explosion. Therefore, the slip coupling apparatus of this invention is ideally adapted to dampen load and engine pulsations and vibrations. Also, the engine is protected against torsional torque peaks resulting when high inertia loads are coupled to the engine. Elaborate engine torsional and spring damping systems may be substantially eliminated. It is also apparent that the eddy-current couplings will relieve the engines of the pulsations from the piston pumps. In this particular, eddy-current slip couplings are superior to friction and hydraulic clutches.

Another advantageous feature of operation provided by the slip coupling apparatus is that the peak torque transmitted by the coupling is limited. Eddy-current couplings, having a torque-slip characteristic such as shown in Fig. 3, will not transmit a torque in excess of a value determined by the excitation of the field coil, but rather will slip when the torque tends to exceed this predetermined value. The clutch excitation is controlled so that when the load torque becomes excessively high, the engine is not slowed down below its regular operating speed, but rather the clutch decouples. Thus, the engine is protected against breakdown from vibrations ensuing at below normal operating speeds.

The control system forming a part of this invention is particularly adapted to the characteristics of internal combustion engines and to the load-torque characteristics of a drilling rig. Briefly, the excitation of the field coil of each slip coupling is made a function of the speed of its associated engine, such that the excitation rises sharply at a critical value of engine speed, the critical value of engine speed being variable. The excitation is insignificant below the critical speed. This relation between the coupling excitation and the engine speed is conveniently obtained by connecting a clutch-energizing generator (G1, G2 and G3 for engines E1, E2 and E3, respectively) to the output shaft of each engine. The generator G1 is shown in Fig. 1 as connected directly to the output shaft 1 of the engine, but it will be understood there may be gearing, or the like for raising the generator speed relative to the engine speed.

Figure 2:
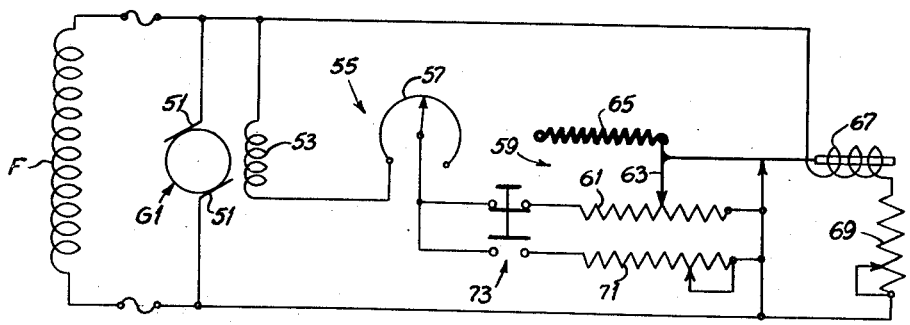
Fig. 2 is a circuit diagram of a control system of this invention.

Referring now to Fig. 2 of the drawings, there are shown commutator brushes 51 of the generator G1 connected across the field coil F of the coupling C1. This generator is a D. C. self-excited, shunt-field type designed to produce a sharply rising speed-voltage characteristic at a critical value of speed. Machines adapted to produce this characteristic are known in the art.

Figure 4:
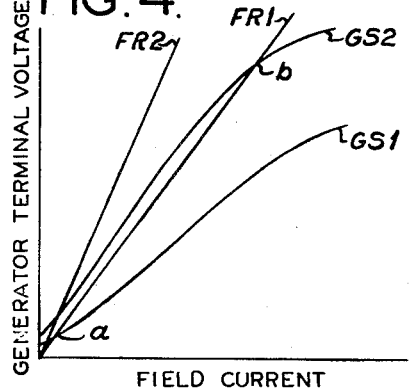
Figs. 4 and 5 are plots illustrating certain characteristics of the clutch-energizing generator.

Referring to Fig. 4, there are shown plots GS1 and GS2 of the generator voltage output as a function of the field current for two different values of speed. If the generator is operating at a speed that results in the curve GS1 (called the saturation curve) and the field-circuit resistance is such that the field current is determined by the line FR1, then the generator output fails to build up, the terminal voltage being an insignificant value determined by the intersection of GS1 and FR1 at $a$. If the generator speed is increased, the saturation curve moves to the left as shown by GS2. As the generator speed approaches a value resulting in a saturation curve which is more to the left of the line FR1, the generator output rises suddenly to a value as indicated at $b$. This is the critical speed. A further increase in speed would produce a further increase in terminal voltage, but this voltage would be limited by the saturation of the iron or tapering off of the saturation curve. If the field-circuit resistance were as indicated by line FR2, then the critical speed would be greater than that for the field-circuit resistance indicated by FR1, inasmuch as a greater increase in speed would be required to move the saturation to the left beyond the line FR2.

It is thus apparent that a sharply rising terminal-voltage characteristic is obtained, and that the speed at which the sharp build-up occurs is readily varied by changing the resistance in the field circuit of the generator.

Referring to Fig. 2, a shunt field 53 of the generator G1 is connected in a field circuit 55 across the generator brushes 51. This field circuit 55 includes a rheostat 57 for manually controlling the resistance of the shunt field circuit 55, and thereby the critical speed at which the generator voltage build-up occurs.

In order to protect the generator and the field coil F, the terminal voltage of the generator should not be permitted to become excessive. Thus the control includes a regulator 59 that reduces the generator field excitation in response to an increase in the terminal voltage above a predetermined value. The regulator 59 comprises a variable resistor 61 having a sliding contact 63 spring biased at 65 in a direction to remove resistance from the field circuit 55. The sliding contact 63 is moved in the opposite direction by a solenoid 67, which is connected across the brushes 51 of the generator in order to be responsive to the terminal voltage. An adjustable resistor 69 is connected in series with the solenoid coil 67 to permit adjustment of the response of the regulator. When the terminal voltage of the generator increases above a predetermined value, the solenoid 67 moves the sliding contact 63 in a direction to add resistance to the shunt-field circuit of the generator, thereby limiting the terminal voltage although the generator speed continues to rise.

It will be understood that other types of regulators may be employed in place of the sliding contact type shown in the drawing; for example, a solenoid-operated carbon pile type of regulator may be employed. The control also includes an emergency circuit consisting of a resistor 71 connected around the regulator 59, and a switch 73 normally closing the regulator part of the circuit but adapted when actuated to disconnect the regulator and connect the resistor 71 in the generator field circuit 55. The resistor 71 of the the emergency circuit is adjusted to limit the field excitation and terminal voltage of the generator when the switch 73 is actuated, thereby limiting the maximum generator voltage, in the event of a voltage regulator failure. This limits the operational range to the upper portion of the engine speed range, which is sufficient for emergency purposes.

Additionally, it will be understood that different types of generators may be employed in place of the shunt-field generator and terminal-voltage limiting means. For example a third-brush type generator has a steeply rising voltage curve with a leveling off at a predetermined voltage. Such generators are also known in the art. A rheostat would be connected in the field circuit of the third-brush generator for varying the critical speed in the same manner in which the rheostat 57 is employed. A shorted-brush generator might also be used, or a generator connected with a pilot generator, so as to limit the terminal voltage above a certain speed. The pilot and the main generator would both be of the self-excited shunt-field type; however, the critical speed for voltage build-up would occur at a low value for the main generator and a relatively higher value for the pilot generator. The armature of the pilot generator would be connected in the field circuit of the main generator to oppose shunt-field excitation of the main generator.

A sharply rising voltage curve at a critical speed is desirable, from the viewpoint of increased efficiency and from the viewpoint of rapid coupling and decoupling of the engine from the load. If desired, commutating poles may be provided to reduce arcing at the commutator.

Figure 5:
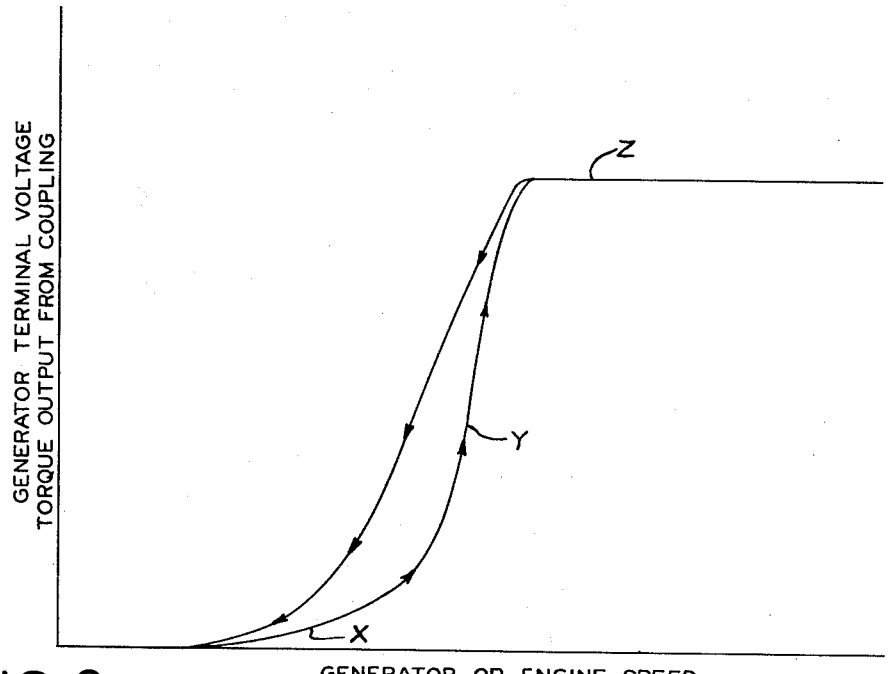

The speed-voltage characteristic of the control, for a given value of field-circuit resistance, is plotted in Fig. 5 of the drawings. The terminal voltage remains relatively low as indicated at X up to a critical speed, then rises sharply as indicated at Y to a predetermined value Z above which further increase in speed has little effect upon the terminal voltage. Because of the hysteresis effect of the iron, the actual value of the terminal voltage for a given speed depends upon whether the speed has been increasing or decreasing.

Inasmuch as the generator is mechanically coupled to the engine, the terminal voltage varies with the engine speed. Also, the excitation of the slip coupling, and therefore the torque transmitted by the coupling, varies with the terminal voltage of the generator. This relationship is shown on the plot of Fig. 5.

Several methods of operating this control are available. In one, the rheostat 57 is set so that the critical speed at which the generator output builds up corresponds to an engine speed slightly in excess of the engine idling speed. The operator may then use the engine throttle to pick up the load. When the throttle is advanced, the engine speeds up and the terminal voltage of the generator rises sharply from an inappreciable value to a maximum. The clutch is excited and the load smoothly picked up. Variations in the load speed may be obtained by control at the engine throttle, the speed range being from a value corresponding to the critical generator speed to the maximum engine speed. If the torque pulled by the load is greater than the maximum torque available from the engine, so that there is a tendency to slow down the generator below the critical speed, the engine is automatically partially decoupled from the load, thereby protecting the engine against overload or against such overload as to reduce the engine speed to dangerously low values.

If the engine should fail, it is automatically disconnected from the load, because the engine decreases its speed, decreasing the generator speed, which in turn decreases the clutch excitation and decouples the clutch.

Figure 6:
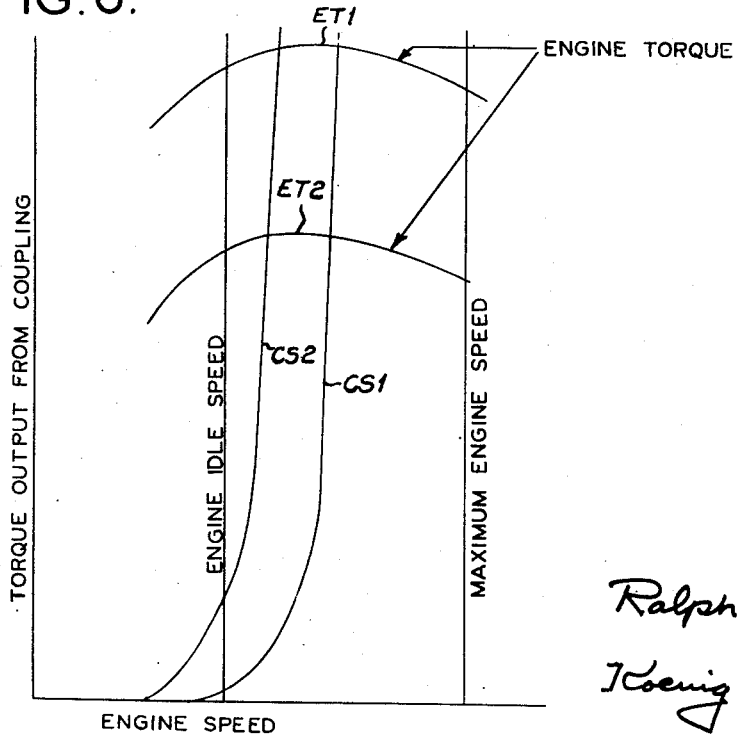
Fig. 6 is a plot illustrating the control characteristics of this invention; and, Fig. 7 is a plot alternative to that of Fig. 6 but similar thereto.

The behavior of the system during a hoisting operation is now considered. For simplicity of discussion, assume there is one engine E1 and associated coupling C1 connected to drive the hoist DW, and the associated change-gear transmission T1 is set so that the prime mover can carry the load. The rheostat 57 is set to provide a critical speed larger than the idling speed of the engine, preferably corresponding with the peak of the engine torque-speed characteristic. Referring to Fig. 6, the engine idle speed is as indicated and the rheostat is set to provide a clutch speed-torque characteristic CS1. When the engine throttle is advanced, the engine speeds up to a value in excess of the critical speed as indicated at CS1. The coupling is energized and load is smoothly applied to the engine.

In starting the hoist, the starting torque required may be quite high; however, this control protects the engine. The prime mover merely slows down until the generator critical speed is reached, at which point the decoupling of the load begins. A balance is reached at which the engine operates at a speed corresponding to the generator critical speed with the torque output of the coupling matching the engine torque for that particular throttle setting, as indicated by the curve ET1 of Fig. 6. If this torque transmitted by the coupling is sufficient to operate the hoist, the engine will then operate along the curve ET1 between CS1 and the maximum engine speed determined by the engine governor.

If the torque transmitted by the coupling is insufficient to operate the hoist, then the driven member of the coupling remains stationary, with the driving member applying a torque to the driven member determined by the intersection of the critical speed curve CS1 and the engine torque curve ET1 for that particular throttle setting, the power of the engine being dissipated as heat in the coupling. Another engine may be cut in to increase the power to the hoist, or the engine throttle may be pulled back to reduce the engine speed and decouple the engine from the hoist so as to permit the change-gear transmission T1 to be adjusted to provide greater torque on the hoist.

It is consequently apparent that the hoisting operations are readily controlled by the engine throttle, the load being picked up or dropped according to the throttle position. It is even possible to hold a load of drill pipe in an elevated position or to lower the load of drill pipe with braking, in cases of emergency. To hold the hoist against the pull on the winch of an elevated load of drill pipe, the engine is throttled down (ET2) until the engine torque developed at the critical speed matches the corresponding torque applied to the driven member of the coupling by the elevated load of drill pipe. If the torque applied to the driving member of the coupling by the engine is less than the torque applied to the driven member of the coupling by the drill pipe, then braked lowering of the drill pipe occurs.

A particular davantage of this system incorporating a variable-speed prime mover is the comparatively greater efficiency over slip coupling systems having a fixed-speed prime mover with variable speed being obtained entirely by slip at the coupling. In other words, the coupling operates with a nominal slip over the speed range from the critical speed to the maximum engine speed, substantial slip of the coupling occurring only when the driving member is rotating at a speed less than the critical speed.

It will be noted from Fig. 6 that the speed of the driving member of the coupling may be reduced within limits while maintaining the torque by shifting the critical speed curve to the left as viewed in Fig. 6 such as, for example, as shown by curve CS2. Also, variation in torque for low values of torque may be obtained by adjusting the throttle of the engine so that the engine runs at a low speed, for example, idling speed, and by then providing the critical speed curve CS2 which intersects the engine idling speed line. Conversely, if the critical speed curve is as shown by CS1 then small values of torque will be transmitted by the coupling if the engine speed is held below the critical speed, for example, by varying the engine speed between engine idling speed and the critical speed. Torque variation for high values of torque is preferably accomplished by adjusting the engine throttle, since this is the more efficient method.

Figure 7:
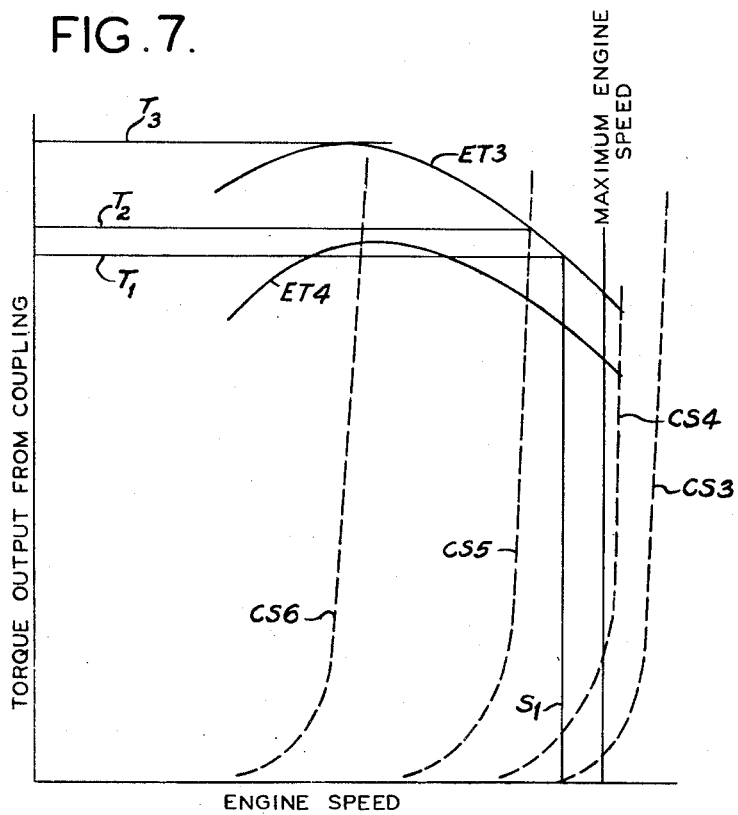

Another method of operating this system is to open the throttle of the engine the maximum amount so that the engine when not loaded responds to governor control. In this event, the control rheostat 51 is adjusted normally to provide a critical speed (CS3, of Fig. 7) greater than the maximum speed of the engine as determined by the governor. Load is then applied to the engine by reducing the field-circuit resistance to reduce the critical speed of the generator. Referring to Fig. 7, the intersection of the critical speed curve CS4 with the maximum speed line determines the torque transmitted by the coupling for low values of torque at high values of engine speed. Consequently, the torque supplied by the coupling and the speed of the load may be controlled at low torques by means of the coupling. At higher torques it is preferred that torque be controlled by means of the engine throttle, this arrangement being desirable because of the better efficiencies obtained.

Although only one control circuit is described, it will be understood that each of the couplings is equipped with its own control system, and that the control rheostat of each control system and the throttle of each engine may be connected to master operators for collective control of the couplings.

Consideration is now given to drilling operations, reference being made to Fig. 7 of the drawings. Assume the throttle setting of the engine is such that its torque-speed characteristic is as indicated by the curve ET3. It is also assumed that the drilling conditions are such that the engine is operating at a speed $S_1$ delivering a torque $T_1$. The critical speed curve might be as indicated by CS5. The advantage of this arrangement is that the drill pipe is protected against an excess torque being transmitted by the coupling. If the drill pipe should stick, the engine torque starts to rise as the result of reduced engine speed. The engine torque would only rise to a value as indicated at $T_2$, at which point, as shown by the critical speed curve CS5, decoupling of the engine would begin, thus preventing the engine torque from rising to a higher value, such as indicated at $T_3$, which would break the pipe.

An alternative method of protecting the drill pipe against breaking during drilling operation would be to adjust the engine throttle so that the maximum engine torque ET4 is well below a value that would break the pipe. In this event, the critical speed curve could be as indicated at CS6, the principal purpose then would be to prevent stalling of the engine.

It will be noted that the engine has many characteristics which make the invention desirable for application in the field of multi-unit internal combustion engine plants, where the engines are coupled together so that they normally operate in synchronism. A number of problems are presented in such use, among which might be mentioned: (1) dampening of vibrations, which are quite severe with large engines, especially where there is a tendency for the engines to set up harmonics or where the load is pulsating as is the case, for example, with piston pumps; (2) starting of the engines and placing them on the load; (3) automatically removing a dead or defective engine from the load; and, (4) controlling the engines while they are operating in synchronism.

The slip coupling itself has a pronounced effect in dampening vibrations transmitted to one engine from the other engines and from the load. As a result, engine life is substantially improved and elaborate expensive torsional torque peak limiting devices are not required, as might be the case with ordinary clutches.

In placing a given engine upon the load, it is merely necessary to increase the engine speed by means of the engine throttle or to decrease the critical generator speed by means of the rheostat. The load is picked up smoothly without overloading the engine and without subjecting the engine to severe vibrations as might be the case with friction clutches. If the torque requirements of the load are excessive, the engine may operate at a safe speed with the clutch slipping. The engine may continue to operate while a second engine is started up and placed on the load; or the engine may be decoupled and a change made in the change-gear transmission. The automatic decoupling of a dead or defective engine has been discussed above.

In considering the control of several engines, it will be noted that such control is readily obtained by the collective operation of their respective throttles through a single master operator, or by the collective operation of their respective rheostats through a master operating lever. The over-all efficiency is high because the slip couplings are relatively completely engaged throughout most of the speed range. Nevertheless, instantaneous slips may occur to absorb vibrations and pulsations; and there is rapid decoupling under abnormal conditions.

It may be noted that the control of this invention is useful wherever it is desired automatically to apply a load to a prime mover only after the prime mover is operating above a predetermined speed. For example, the controlled coupling apparatus could be employed to permit starting of an induction motor without load and to cause load to be applied automatically after the motor has reached normal operating speed.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. Control apparatus for a variable-speed prime mover and an electromagnetic slip coupling having a driving member and a field coil, comprising a D. C. self-excited shunt-field generator mechanically coupled to the driving member of the slip coupling, the armature of the generator being permanently connected across the field coil of the slip coupling, the shunt field coil of the generator being in a circuit including variable impedance means which is permanently connected across the armature of the generator, and an output-limiting control circuit including a solenoid coil connected across the armature of the generator, the solenoid being adapted to actuate the variable impedance means in the field circuit of the generator.

2. Apparatus as set forth in claim 1 further including an emergency circuit comprising a resistance and a switch by-passing the solenoid-operated variable impedance means in the field circuit of the generator.

3. Controlled coupling apparatus for a prime mover having a predetermined minimum speed and a predetermined torque at said speed; the apparatus comprising an electromagnetic slip coupling having a field coil, the excitation of which controls the torque transmitted by the coupling, said coupling having a torque-slip characteristic for normal excitation such that the maximum torque transmitted at a slip corresponding to said predetermined minimum speed of the prime mover is greater than said predetermined maximum torque of the prime mover, whereby the coupling may be normally operated with small slip, and a D. C. generator driven from the prime mover side of the coupling and permanently connected during operation to the field coil of the coupling, a shunt field coil connected in a circuit with the generator, a field resistance connected with said shunt field, a variable impedance connected in the shunt field circuit, and relay means connected to the output of the generator actuating said variable impedance at a predetermined voltage to limit the maximum voltage of the generator, said generator circuit having a sharply rising voltage-speed characteristic whereby the output voltage of the generator circuit is sharply reduced from a value sufficient to supply significant energization to the coupling when the speed of said prime mover falls below said predetermined minimum value.

4. Controlled coupling apparatus for use with an internal combustion engine having a predetermined idling speed and adapted automatically to pick up and drop a load as the engine is accelerated from idling and decelerated to idling speed respectively; the apparatus comprising an eddy-current coupling having relatively rotary field and inductor members and a field coil, the excitation of which coil controls the slip of the coupling, one of said members being an input member driven by said engine and the other of said members being an output member, a generator circuit including an armature mechanically driven from the input member and permanently connected to said field coil during normal operation, a shunt-connected field coil, a field resistance connected in the generator circuit, a variable impedance connected in the generator field circuit, and relay means connected to the output of the generator armature actuating said variable impedance at a predetermined voltage to limit the maximum voltage of the generator, said generator circuit having a sharply rising voltage-speed characteristic whereby the output voltage of the generator circuit builds up to and drops off sharply from a value sufficient to supply significant energization to said coupling at approximately said predetermined idling speed.

5. Controlled coupling apparatus for an internal combustion engine having a predetermined stalling speed and stalling torque; the apparatus comprising an electromagnetic slip coupling having a field coil, the excitation of which controls the torque transmitted by the coupling, said coupling having a torque-slip characteristic for normal rated excitation such that the torque transmitted at a slip corresponding to said predetermined stalling speed is greater than said predetermined engine stalling torque, whereby the coupling may normally be operated with small slip, a D. C. generator driven from the engine side of the prime mover and permanently connected during operation to excite the field coil of the coupling, a shunt field coil connected in a circuit with said generator, a field resistance series-connected with the shunt field, a variable impedance connected in the shunt field circuit, and relay means connected to the output of the generator actuating said variable impedance at a predetermined voltage to limit the maximum voltage of the generator, said generator circuit having a sharply rising voltage-speed characteristic whereby the output voltage of the generator circuit is sharply reduced from a value sufficient to supply significant energization to the coupling when the speed of the engine tends to fall below said predetermined stalling speed.

6. In an oil-well drilling rig including a plurality of engines each having a predetermined idling speed and including transmission apparatus for coupling the engines to the various elements of the drilling rig; controlled coupling apparatus connecting each engine to said transmission, each coupling apparatus for each engine comprising an electromagnetic slip coupling having a field coil, the excitation of which controls the torque transmitted by the coupling, each coupling being of a relatively larger capacity than the associated engine, whereby the coupling may normally be operated at minimum slip, a D. C. generator driven from the engine and permanently connected during operation to excite the field coil of the respective coupling, a shunt-connected field coil in each generator, and a resistance in each shunt field circuit providing a critical generator speed for voltage build up corresponding approximately to a speed slightly in excess of the idling speed of the respective engine, whereby any engine is automatically decoupled from said transmisssion when its speed is reduced to idling values.

7. Controlled coupling apparatus as set forth in claim 6, further including a variable impedance connected in each shunt field circuit, and relay means connected to the output of the generator actuating said variable impedance at a predetermined voltage to limit the maximum voltage of the generator.

8. Controlled coupling apparatus for variable-speed driving means adapted automatically to pick up and drop a load as the driving means operates at a speed above and below a predetermined critical value; the apparatus comprising an eddy-current coupling having relatively rotary field and inductor members and a field coil, the excitation of which controls the slip of the coupling, one of said members being a driving input member and the other of said members being a driven output member, a generator circuit permanently connected to said field coil during operation solely to excite it, said generator circuit comprising a generator armature mechanically driven from the input member, a shunt-connected field coil, a field resistance, a variable impedance connected in the generator field circuit, and relay means connected to the output of the generator armature actuating said variable impedance at a predetermined voltage to limit the maximum voltage of the generator, said generator circuit having a sharply rising voltage-speed characteristic whereby the output voltage of the generator circuit is insufficient appreciably to energize the eddy-current coupling below said predetermined critical speed and is sufficient to supply significant energization to said coupling only above said predetermined critical speed.

References Cited in the file of this patent

UNITED STATES PATENTS

| Number | Name | Date |
|---|---|---|
| 726,536 | Holz | Apr. 28, 1903 |
| 1,848,091 | Winther | Mar. 1, 1932 |
| 2,123,344 | Rogers | July 12, 1938 |
| 2,185,498 | Carson et al. | Jan. 2, 1940 |
| 2,282,237 | Newton | May 5, 1942 |
| 2,311,893 | Weatherby | Feb. 23, 1943 |
| 2,414,569 | Tubbs | Jan. 21, 1947 |
| 2,462,747 | Jacobs | Feb. 22, 1949 |
| 2,576,872 | Young | Nov. 27, 1951 |